US010667468B1

(12) United States Patent
Tang et al.

(10) Patent No.: US 10,667,468 B1
(45) Date of Patent: Jun. 2, 2020

(54) SPIKE LIGHT AND SPIKE LIGHT ASSEMBLY INCLUDING THE SAME

(71) Applicant: Yi-Wen Tang, Taichung (TW)

(72) Inventors: Yi-Wen Tang, Taichung (TW); Jui-Chi Tang, Taichung (TW)

(73) Assignee: Yi-Wen Tang, Taichung (TW)

( * ) Notice: Subject to any disclaimer, the term of this patent is extended or adjusted under 35 U.S.C. 154(b) by 0 days.

(21) Appl. No.: 16/445,580

(22) Filed: Jun. 19, 2019

(51) Int. Cl.
*H05B 45/10* (2020.01)
*F21V 23/04* (2006.01)
*F21V 21/08* (2006.01)
*A01G 7/04* (2006.01)

(52) U.S. Cl.
CPC .......... *A01G 7/045* (2013.01); *F21V 21/0824* (2013.01); *F21V 23/0442* (2013.01); *H05B 45/10* (2020.01)

(58) Field of Classification Search
CPC ........ A01G 7/045; A01G 31/06; A01G 31/02; A01G 9/247; A01G 31/00; A01G 9/26; A01G 7/02; A01G 2031/006; A01G 27/005; A01G 9/246; A01G 9/023; A01G 27/003; A01G 9/20; A01G 9/24; A01G 22/00; A01G 7/04; A01G 29/00; A01G 31/04; A01G 9/02; A01G 25/16; A01G 27/008

USPC .......................................... 315/152, 118, 153
See application file for complete search history.

(56) References Cited

U.S. PATENT DOCUMENTS

2011/0275275 A1\* 11/2011 Chang .................... A63H 33/30
446/484

\* cited by examiner

*Primary Examiner* — Wei (Victor) Y Chan
(74) *Attorney, Agent, or Firm* — Muncy, Geissler, Olds & Lowe, P.C.

(57) ABSTRACT

A spike light is provided, including: a rod body, a light body and a lifting mechanism. The rod body includes an insertion portion configured to be inserted into a base portion. The light body includes at least one lightening unit, a plant growth sensor and a processor. The lightening unit and the plant growth sensor are electrically connected with the processor. The lifting mechanism includes a first lifting unit and a second lifting unit, and one of the first lifting unit and the second lifting unit is drivable by a power source. The processor drives the power source to drive at least one of the light body and the lifting mechanism when the processor determines that at least one plant height signal is different from a predetermined height signal. A spike light assembly is further provided, including a plurality of said spike lights described above.

10 Claims, 10 Drawing Sheets

SPIKE LIGHT AND SPIKE LIGHT ASSEMBLY INCLUDING THE SAME

BACKGROUND OF THE INVENTION

Field of the Invention

The present invention relates to a spike light and a spike light assembly including the same.

Description of the Prior Art

Plants may be used to landscape the environment and can provide nutrition required for a human body. During planting, insufficient light will affect growth of the plants so that it is important that whether there is sufficient light supplied to the plants.

A conventional flowerpot with lighting function includes a pot, a light body connected to the pot and a controlling switch electrically connected with the light body. The pot is configured to plant a plant, and the light body is configured to provide the light to the plant. However, the light body has to be manually controlled and is integrally formed as a part of the pot, which is inconvenient to use. Furthermore, a height of the light body with respect to the plant cannot be automatically adjusted according to the growth of the plant so that a distance between the plant and the light body is gradually shortened, which affects the growth of the plant.

The present invention is, therefore, arisen to obviate or at least mitigate the above-mentioned disadvantages.

SUMMARY OF THE INVENTION

The main object of the present invention is to provide a spike light and a spike light assembly including the same which are detachably insertable into a base portion, and a height position of a light body of the spike light is adjustable according to growth of plants.

To achieve the above and other objects, the present invention provides a spike light, including: a rod body, a light body and a lifting mechanism. The rod body extends along an axial direction and includes an insertion portion configured to be inserted into a base portion for planting at least one plant. The light body is mounted to the rod body and movable along the axial direction. The light body includes at least one lightening unit, a plant growth sensor and a processor, and the at least one lightening unit and the plant growth sensor are respectively electrically connected with the processor. The at least one lightening unit is configured to project light toward the base portion. The lifting mechanism includes a first lifting unit disposed on the rod body and a second lifting unit disposed on the light body, and one of the first lifting unit and the second lifting unit is drivable by a power source. The second lifting unit is movably connected with the first lifting unit. The power source is electrically connected with the processor. The plant growth sensor obtains a height of the at least one plant and produces and transmits at least one at least one plant height signal to the processor, and the processor drives the power source to drive at least one of the light body and the lifting mechanism when the processor determines that the at least one plant height signal is different from a predetermined height signal.

To achieve the above and other objects, the present invention further provides a spike light assembly, including a plurality of said spike lights as described above, wherein the plurality of said spike lights are communicative with one another in a wired or wireless connection manner.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 5 for a first preferable embodiment of the present invention. A spike light 1 of the present invention includes a rod body 10, a light body 20 and a lifting mechanism 30.

The rod body 10 extends along an axial direction L, and the rod body 10 includes an insertion portion 11 configured to be inserted into a base portion 2 (such as soil) for planting at least one plant. The light body 20 is mounted to the rod body 10 and movable along the axial direction L. The light body 20 includes at least one lightening unit 21, a plant growth sensor 22 and a processor 23. In this embodiment, the plant growth sensor 22 is a camera which is configured to obtain an image of the at least one plant which is provided to the processor 23 for analyzing.

The at least one lightening unit 21 and the plant growth sensor 22 are respectively electrically connected with the processor 23, and the at least one lightening unit 21 is configured to project light toward the base portion 2 so as to provide the light to the at least one plant. The lifting mechanism 30 includes a first lifting unit 31 disposed on the rod body 10 and a second lifting unit 32 disposed on the light body 20. One of the first lifting unit 31 and the second lifting unit 32 is drivable by a power source 33, the second lifting unit 32 is movably connected with the first lifting unit 31, and the power source 33 is electrically connected with the processor 23. Specifically, one of the first lifting unit 31 and the second lifting unit 32 is a toothed rack, the other of the first lifting unit 31 and the second lifting unit 32 is a gear engaged with the toothed rack, and the power source 33 drives the gear to rotate. In this embodiment, the first lifting unit 31 is the toothed rack, the second lifting unit 32 is the gear, the power source 33 is provided from a driving motor so that the light body 20 is adjustably positioned on the rod body 10. In other embodiments, the first lifting unit may be an external thread. Furthermore, the light body 20 further includes a casing 24 and a bearing portion 25. Each of the at least one lightening unit 21 and the plant growth sensor 22 are respectively disposed on a side of the bearing portion 25, and the power source 33 and the second lifting unit 32 are respectively disposed on another side of the bearing portion 25. The casing 24 covers the bearing portion 25, and the power source 33 and the second lifting unit 32 are received between the casing 24 and the bearing portion 25 so as to prevent the power source 33 and the second lifting unit 32 from being damaged due to external factors (such as wind, sun or rain).

Figure 4:
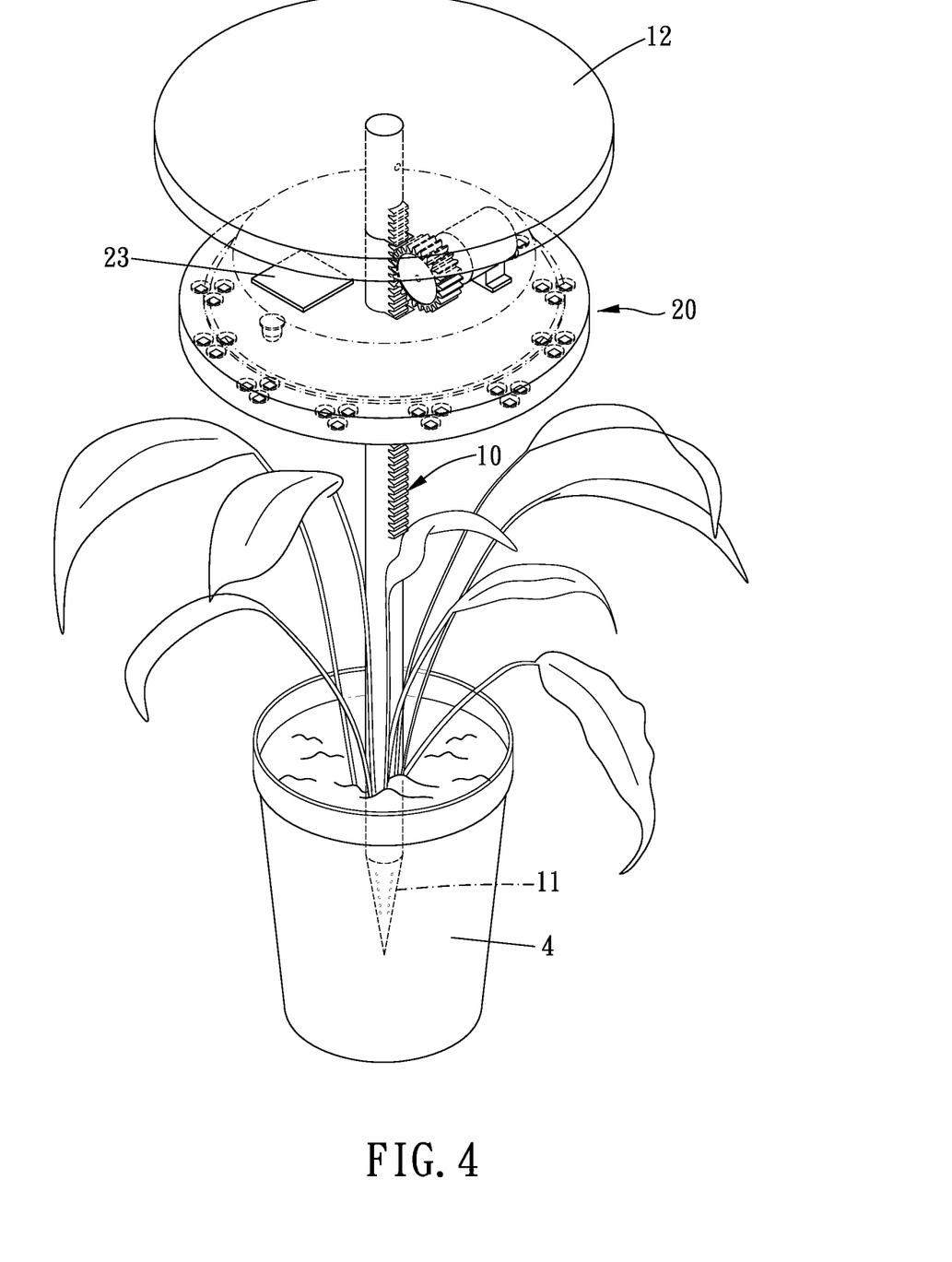
FIG. 4 is a schematic diagram of the first preferable embodiment of the present invention in use.
Figure 5:
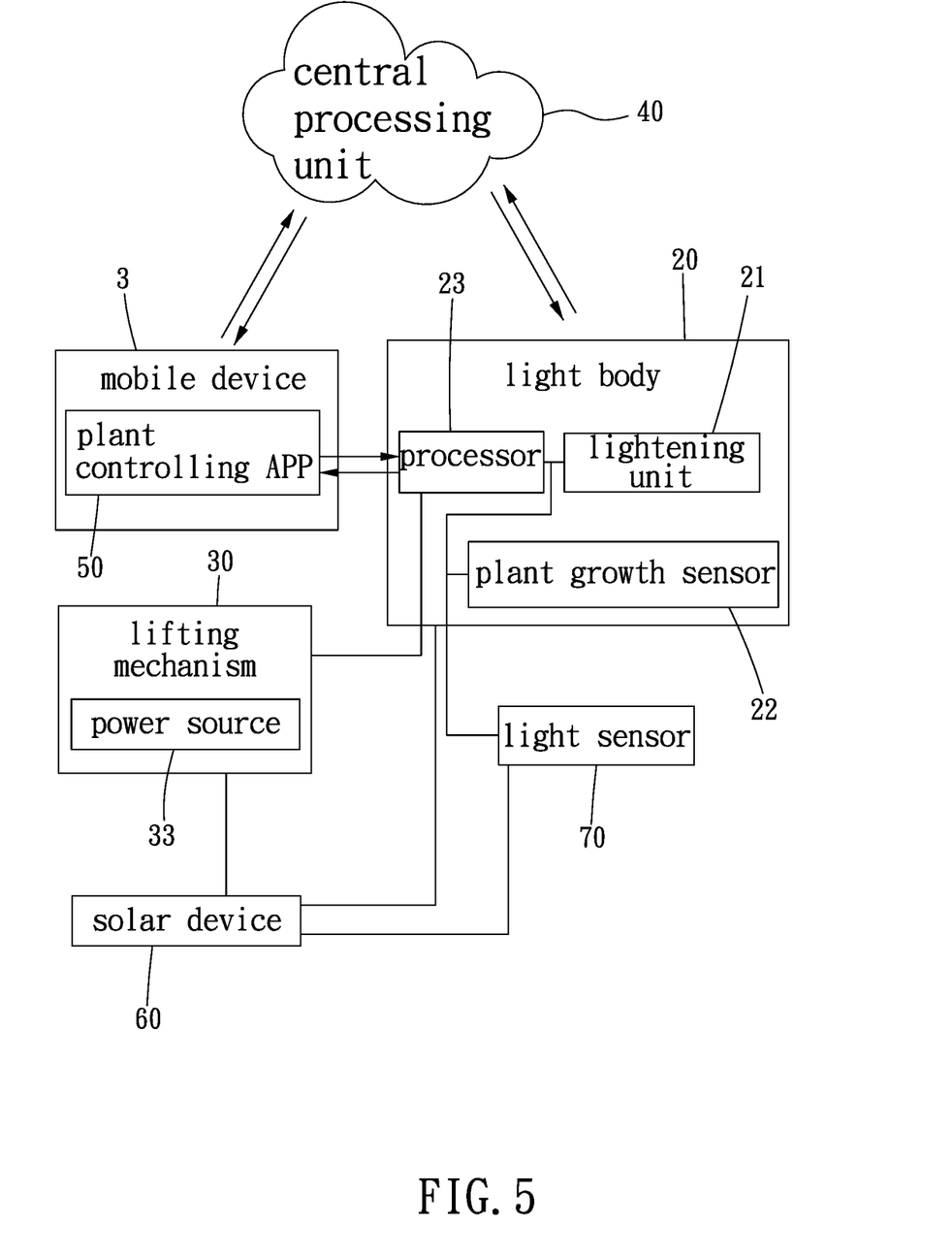
FIG. 5 is a block diagram of the first preferable embodiment of the present invention.

The plant growth sensor 22 obtains a height of the at least one plant and produces and transmits at least one plant height signal to the processor 23, and the processor 23 drives the power source 33 to drive at least one of the light body 20 and the lifting mechanism 30 when the processor 23 determines that the at least one plant height signal is different from a predetermined height signal. Specifically, the processor 23 calculates a difference between the at least one plant height signal and the predetermined height signal and drives the light body 20 to move to an appropriate location. In other words, a position of the light body 20 is automatically adjustable according to the height of the at least one plant so as to keep a proper distance between the light body 20 and the at least one plant. The spike light 1 is detachably inserted into the base portion 2 and is easy to change an insertion position. The base portion 2 may be a container (such as a pot 4), farmland, planting land or the like, and a number of the at least one plant may be plural.

Figure 2:
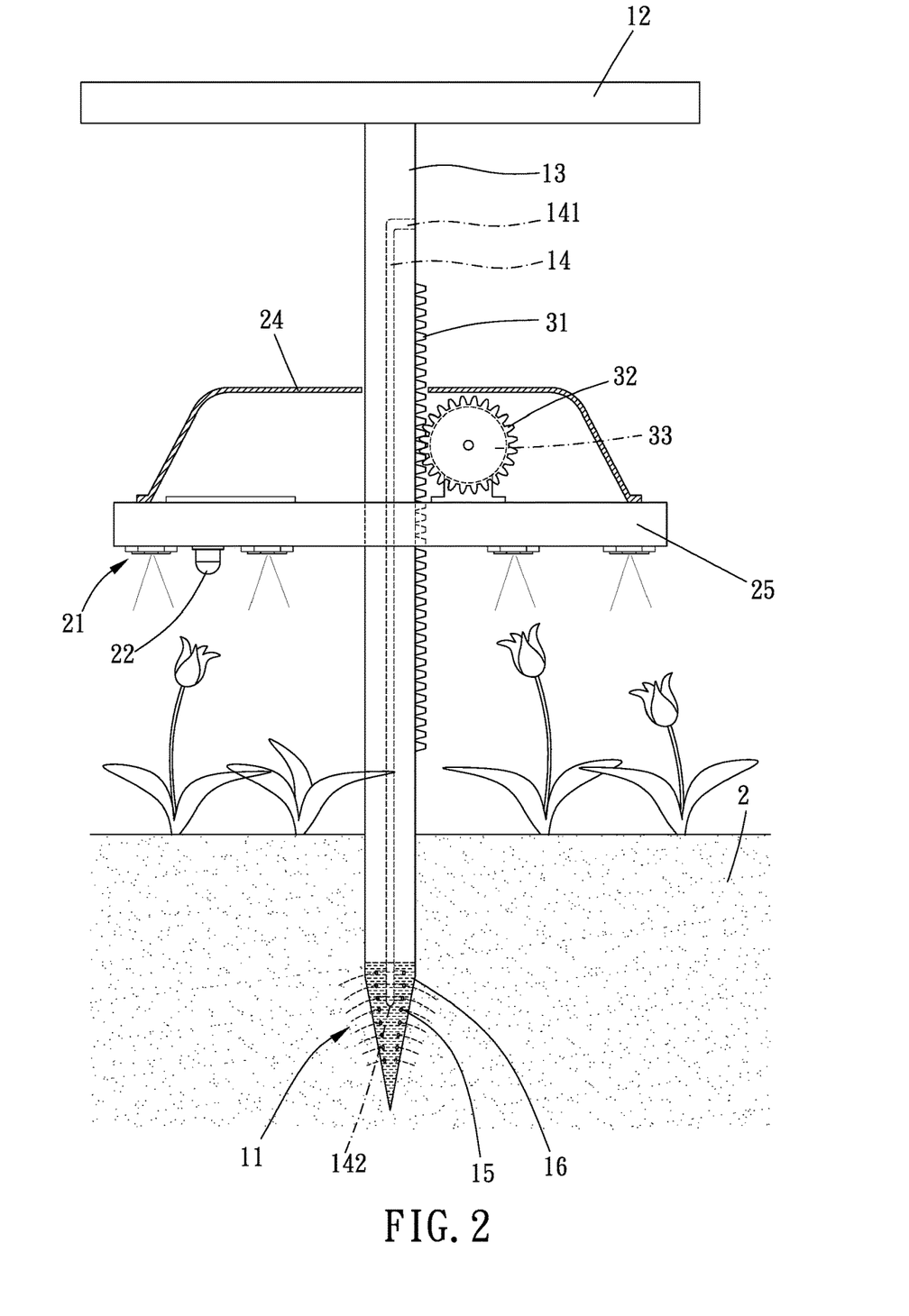
FIGS. 2 and 3 are partial cross-sectional views of the first preferable embodiment of the present invention in operation.
Figure 3:
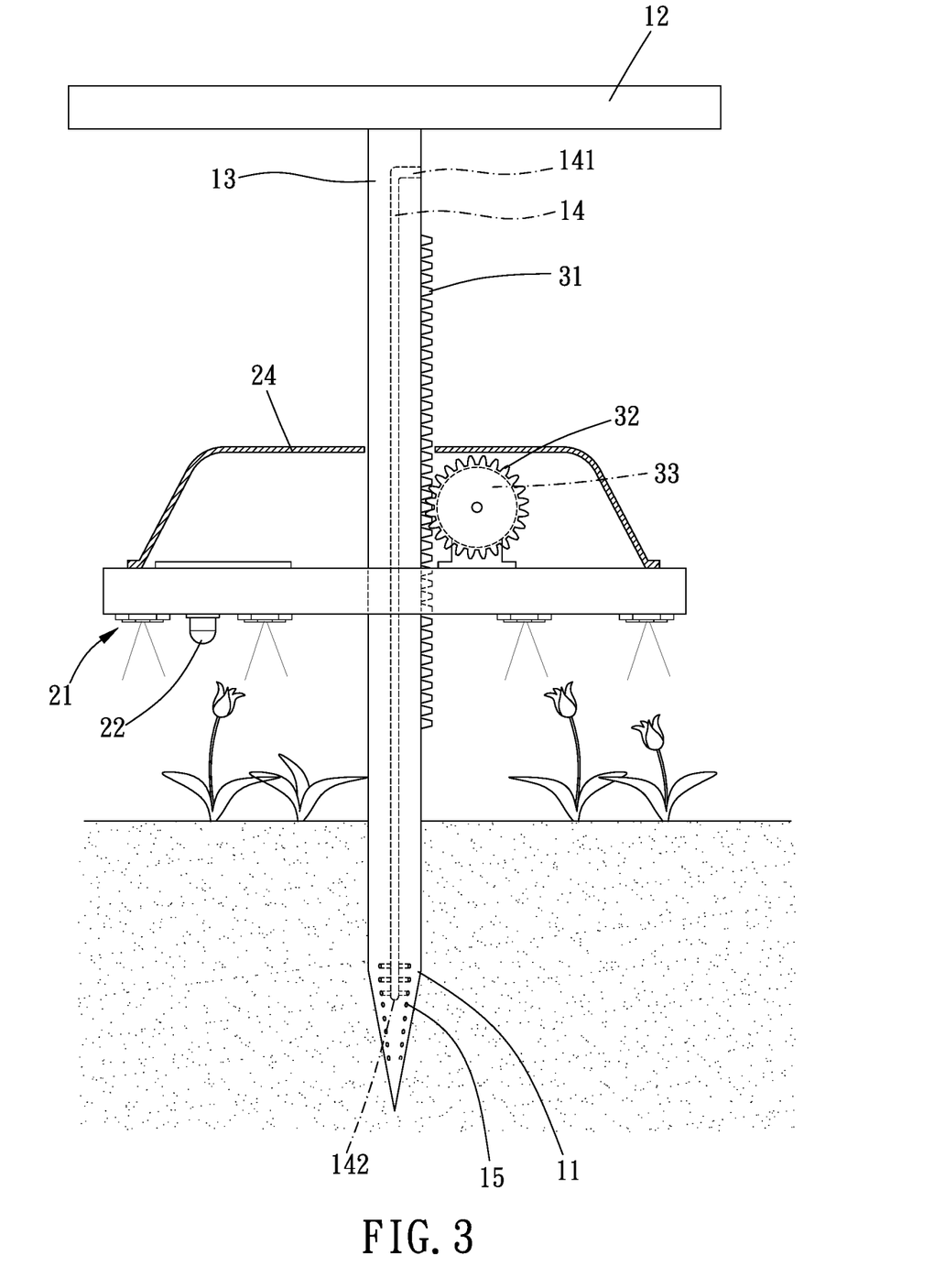

In this embodiment, the insertion portion 11 is sharp so as to be easily inserted into the base portion 2. Preferably, the rod body 10 is a hollow tube, and the base portion 2 (such as soil) can be partially received in the rod body 10 to increase stably positioning effect.

Each of the at least one lightening unit 21 includes a plurality of luminaries, and at least two of the plurality of luminaries have different light colors, such as luminaries 211, 212. Preferably, the processor 23 controls at least one of the plurality of luminaries to be turned on or off according to the at least one plant height signal of the at least one plant sensed by the plant growth sensor 22 so as to provide the at least one plant with required light colors. Each of the plurality of luminaries may be an incandescent lamp, fluorescent lamp, high-intensity discharge (HID) lamp or light-emitting diode (LED). The plurality of luminaries may include red LEDs, blue LEDs, green LEDs, yellow LEDs, orange LEDs, far-red LEDs and ultraviolet light (UV). Irradiating plants by the red LEDs can promote the plants to grow taller; irradiating the plants by the blue LEDs can slow the stem elongation of the plants and promote nitrogen assimilation and synthesis of chlorophyll, protein and antioxidants, and irradiation of the blue LEDs also affects phototropism, photomorphogenesis, stomatal opening and leaf photosynthesis of the plants; irradiating the plants by the green LEDs, the blue LEDs and the red LEDs can harmonize all conditions for the growth of the plants; irradiating the plants by the yellow LEDs and the orange LEDs can improve a nutritional quality of the plants; irradiating the plants by the UV light and the far-red LEDs can regulate the growth of the plants. Therefore, the light colors are adjustable according to plant variety, growth status or other factors.

Figure 1:
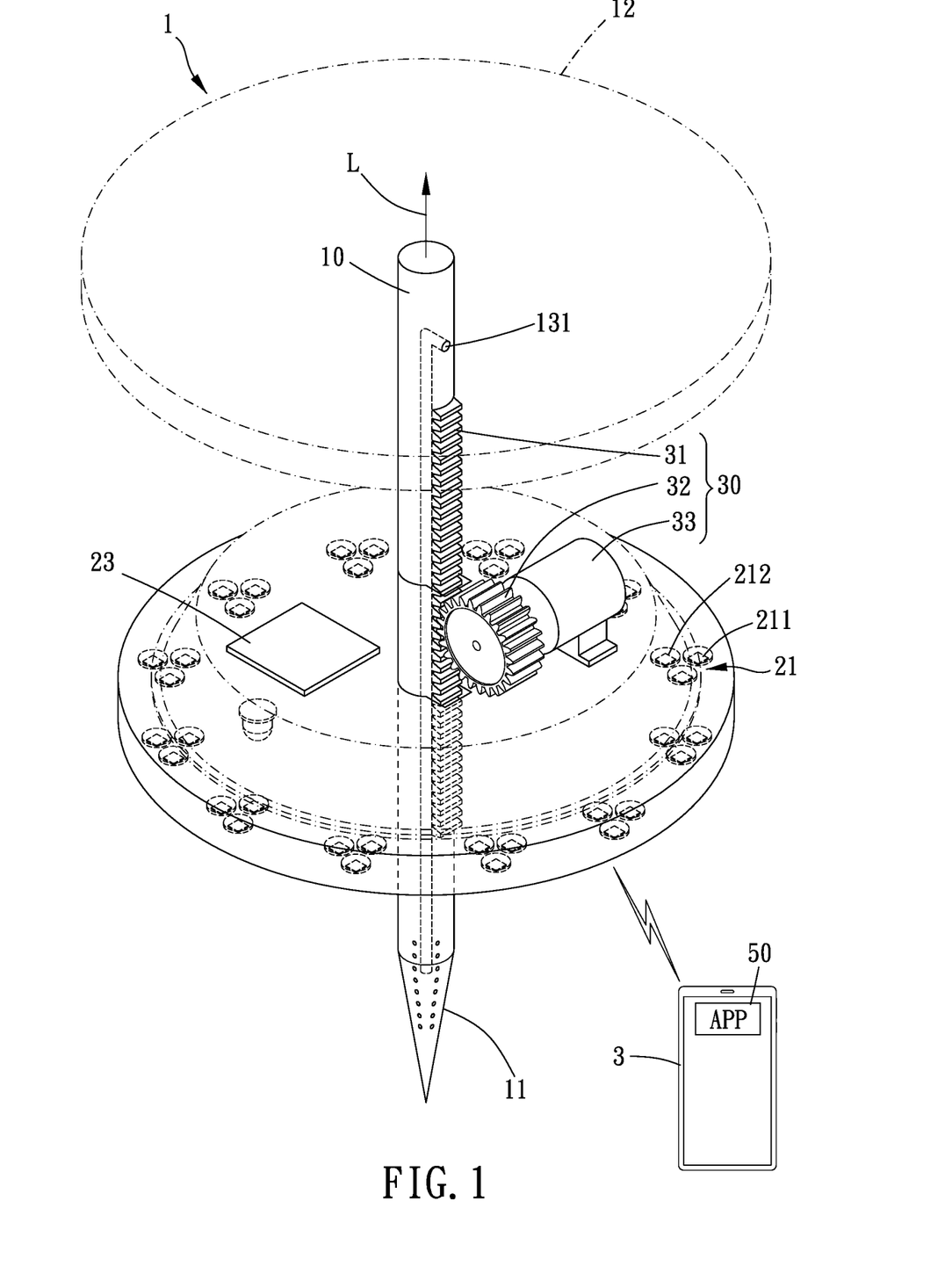
FIG. 1 is a stereogram of a first preferable embodiment of the present invention.

In this embodiment, the light body 20 includes a plurality of said lightening units 21, and the plurality of said lightening units 21 are disposed around the axial direction so as to increase lighting area.

The rod body 10 further includes a sheltering portion 12, and the sheltering portion 12 is spaced apart from the insertion portion 11. The second lifting unit 32 is disposed between the sheltering portion 12 and the insertion portion 11, and the sheltering portion 12 shelters the second lifting unit 32 in the axial direction L from sunlight and rain. Furthermore, the sheltering portion 12 may be covered with a flexible shelter to cover the rod body 10 and the light body 20, and the flexible shelter may be a net which can block insects without interfering operation of the light body 20.

The spike light 1 further includes a central processing unit 40 and a plant controlling APP 50, and the central processing unit 40 may be disposed in a cloud computing architecture (such as a cloud server) or a mobile device 3. The processor 23 and the plant controlling APP 50 are respectively communicated with the central processing unit 40, and the plant controlling APP 50 is wirelessly (such as by Bluetooth or Wi-Fi) communicated with the processor 23 to control the light body 20. The central processing unit 40 stores a processor controlling process information and a plant controlling APP controlling process information, and the plant controlling APP 50 operates to obtain the processor controlling process information and the plant controlling APP controlling process information so that an operator can view a record of the light body 20 controlled by the processor 23 and a record of the light body 20 controlled by the operator. Specifically, the processor controlling process information is the record of the light body 20 controlled, every time, by the processor 23, such as times to turn on or off the power source 33 and each of the plurality of said lightening unit 21. The plant controlling APP controlling process information is the record of the light body 20 controlled, every time, by the plant controlling APP 50. Furthermore, the central processing unit 40 further stores a plurality of plant growth light regulating informations, and the processor 23 controls the plurality of said lightening units 21 according to the plurality of plant growth light regulating informations and the at least one plant height signal sensed by the plant growth sensor 22, such as on or off status, or luminous intensity. Moreover, the plant growth sensor 22 is configured to obtain a plant image information of the at least one plant and upload the plant image information to the central processing unit 40. Specifically, the plant image information may be stored in the mobile device 3 or the cloud computing architecture.

The rod body 10 includes an outer tube 13 and an inner tube 14 which is communicated with the outer tube 13. A circumferential wall of the outer tube 13 includes an opening 131 disposed therethrough, and the outer tube 13 and the inner tube 14 define a liquid storage chamber 16 therebetween. The outer tube 13 has a plurality of through holes 15 which communicate the liquid storage chamber 16 and an external environment. The inner tube 14 is disposed in the outer tube 13, and the inner tube 14 includes a liquid inlet 141 and a liquid outlet 142. The liquid inlet 141 is communicated with the opening 131, the liquid outlet 142 is communicated with the through holes 15 and the liquid storage chamber 16, and liquid is pourable into the liquid inlet 141 through the opening 131. Specifically, the inner tube 14 may be configured to be communicated with a liquid container, and the liquid in the liquid container can be siphoned to the liquid outlet 142 by the inner tube 14. When the base portion (such as soil) is of a low-moisture condition, the liquid is discharged from the plurality of through holes 15; when the base portion 2 is of a sufficient-moisture condition and the plurality of through holes 15 and the liquid outlet 142 are overwhelmed by the liquid, the liquid outlet 142 stops to discharge the liquid. In other embodiments, the inner tube may be communicated with a water source (such as a faucet) so as to pour the liquid thereinto.

Preferably, the liquid outlet 142 is closer to the insertion portion 11 than the plurality of through holes 15, the liquid is discharged from the liquid outlet 142 to the outer tube 13 and then discharged through the plurality of through holes 15 to the base portion 2. In other embodiments, the opening may be communicated with a liquid storage device, and the liquid in the liquid storage device is pumped into the inner tube by a water pump.

Figure 6:
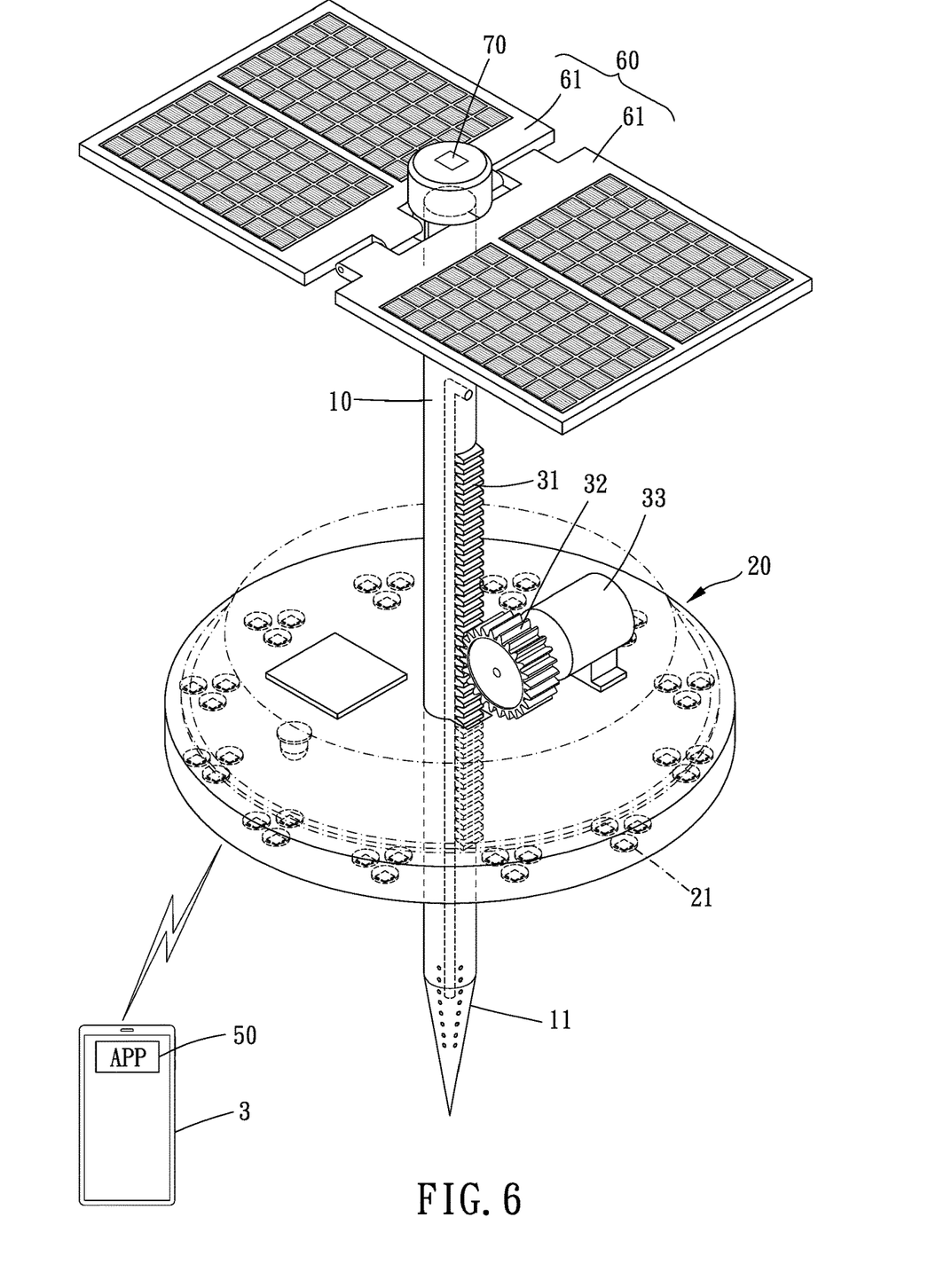
FIG. 6 is a stereogram of a second preferable embodiment of the present invention.
Figure 7:
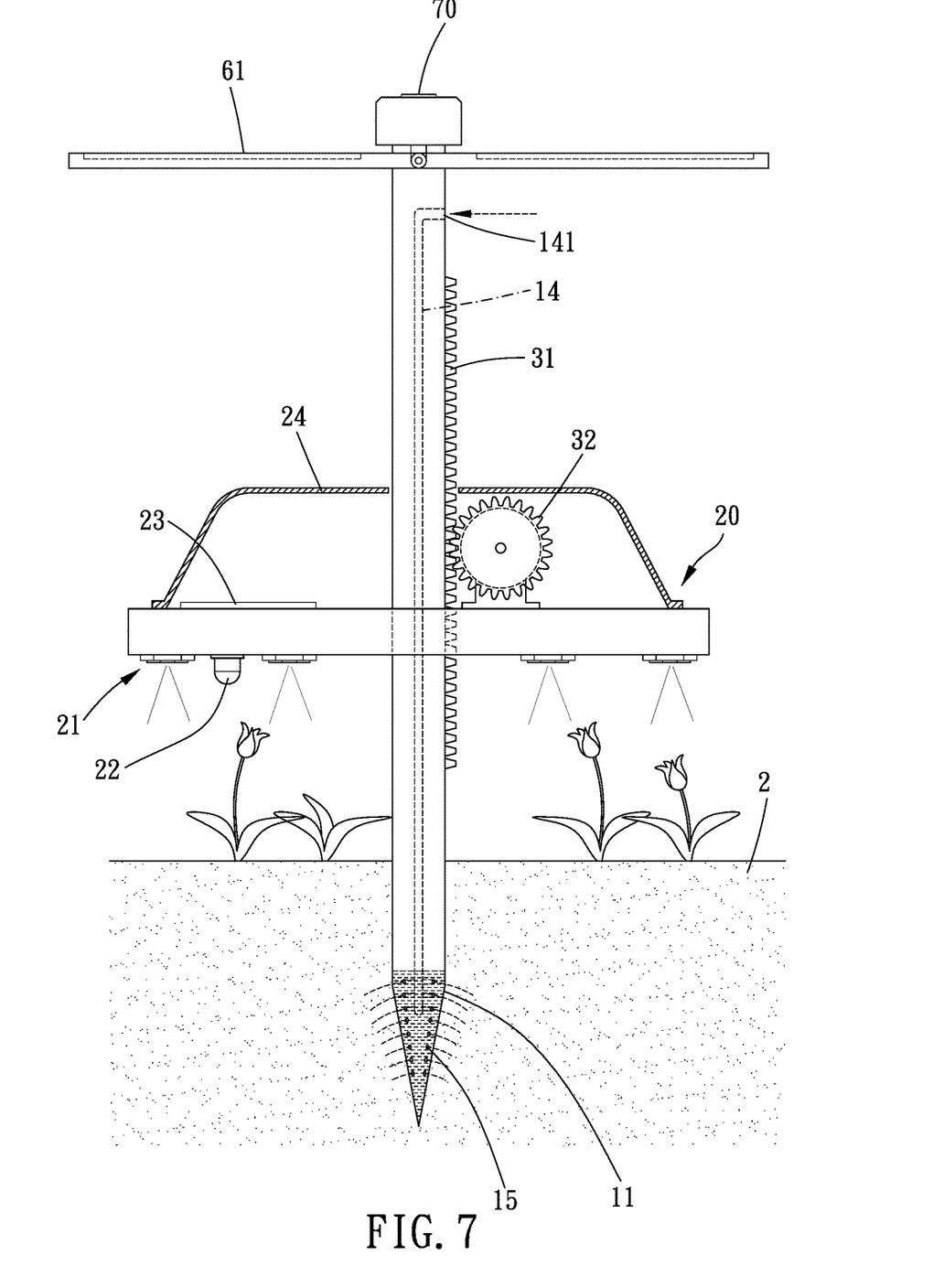
FIGS. 7 and 8 are schematic diagrams of the second preferable embodiment of the present invention in operation.
Figure 8:
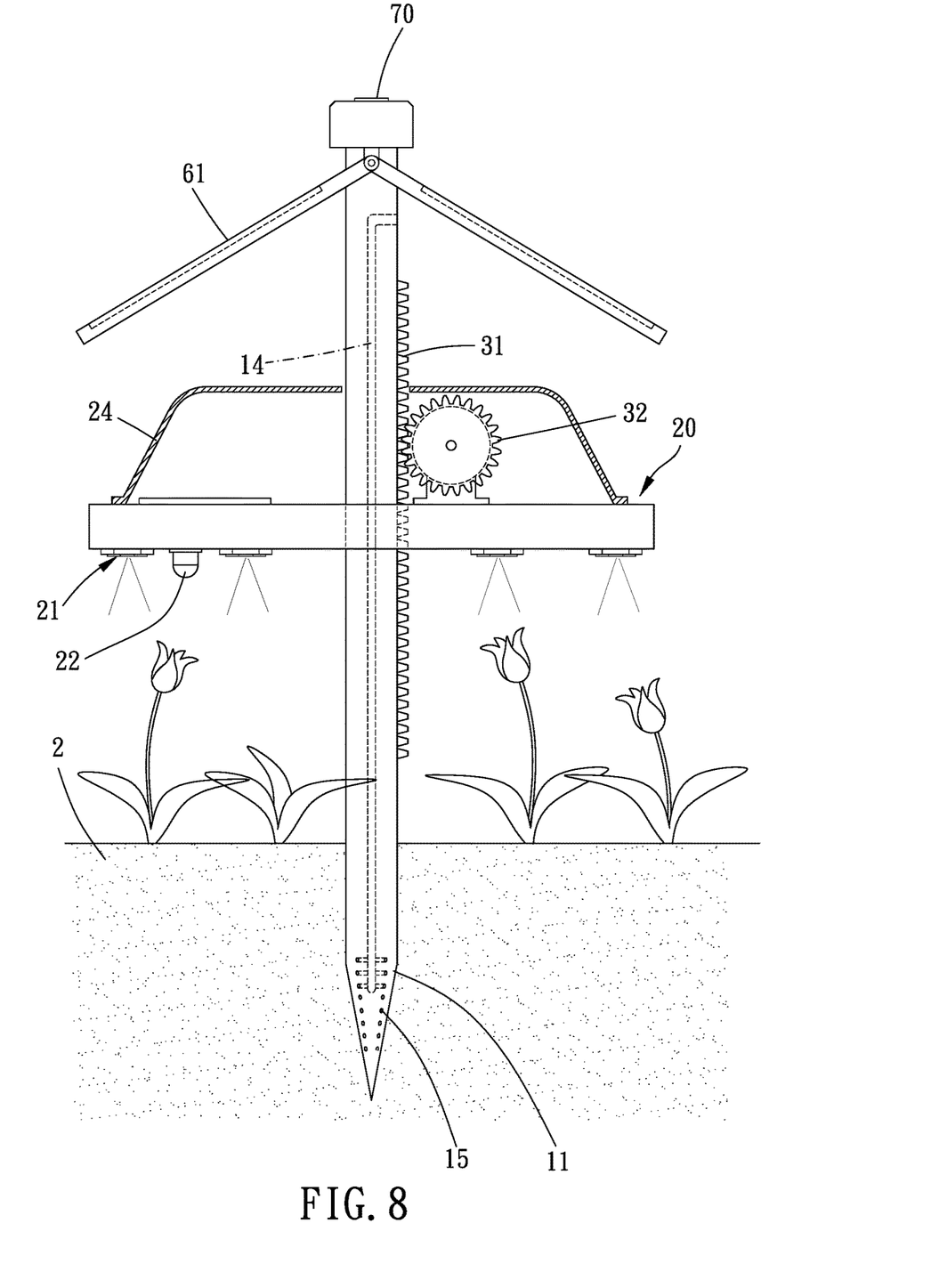

Please refer to FIGS. 6 to 8 which show a second preferable embodiment of the present invention. The spike light 1 further includes a solar device 60, and the solar device 60 includes two solar panels 61. The solar device 60 is electrically connected with the light body 20 and the lifting mechanism 30. Specifically, the solar device 60 is electrically connected with each of the plurality of said lightening units 21, the plant growth sensor 22, the processor 23 and the power source 33, and the two solar panels 61 are swingably disposed on the rod body 10 so that the two solar panels 61 are swingable to appropriate positions according to a direction of sunlight.

The light body 20 further includes a light sensor 70 which is electrically connected to the processor 23. The processor 23 controls the plurality of said lightening units 21 and an angle between respective one of the two solar panels 61 and the axial direction L according to an ambient light information produced by the light sensor 70 so as to control the two solar panels 61 to swing according to a direction and intensity of environmental light.

Figure 9:
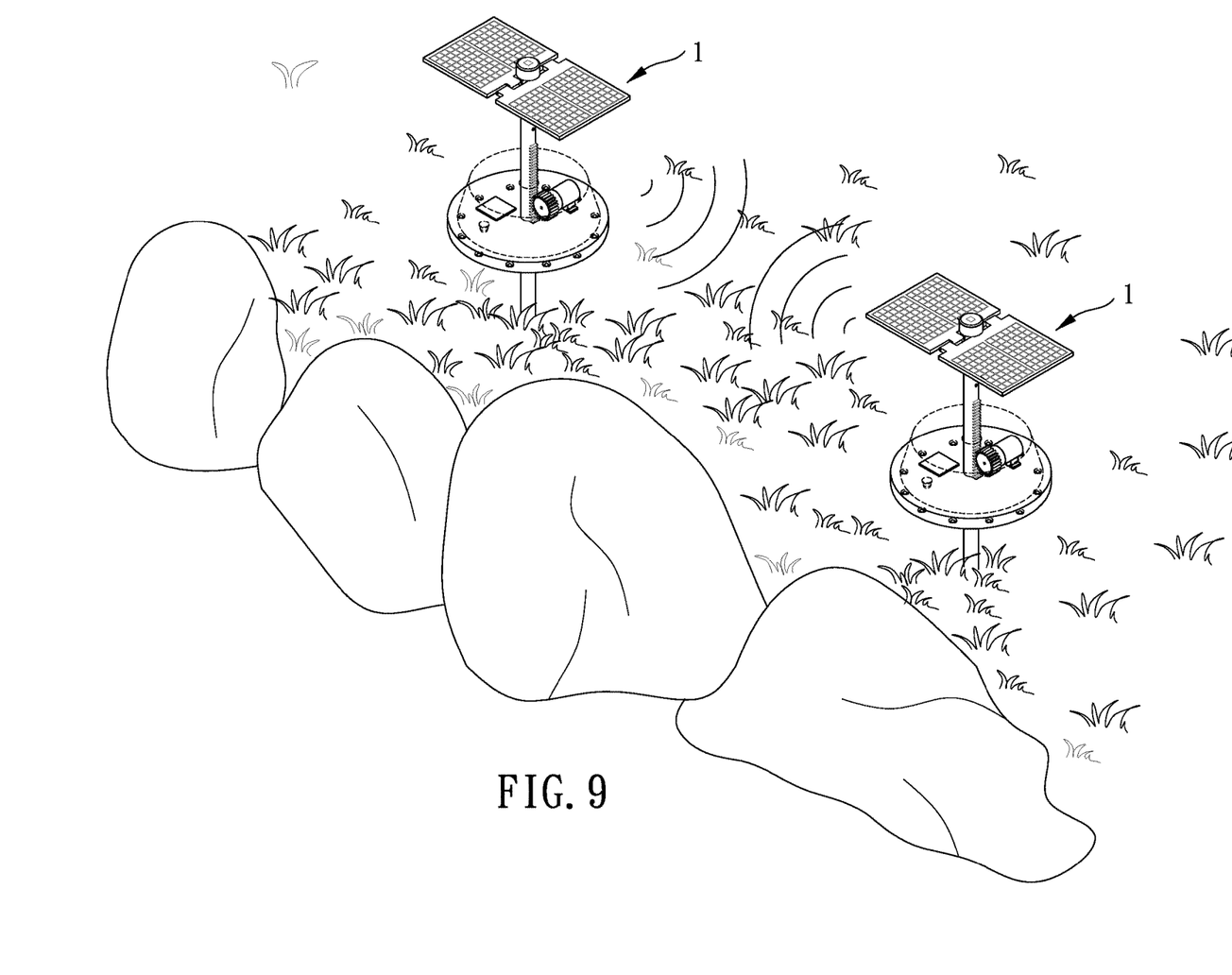
FIG. 9 is a schematic diagram of the second preferable embodiment of the present invention in use.
Figure 10:
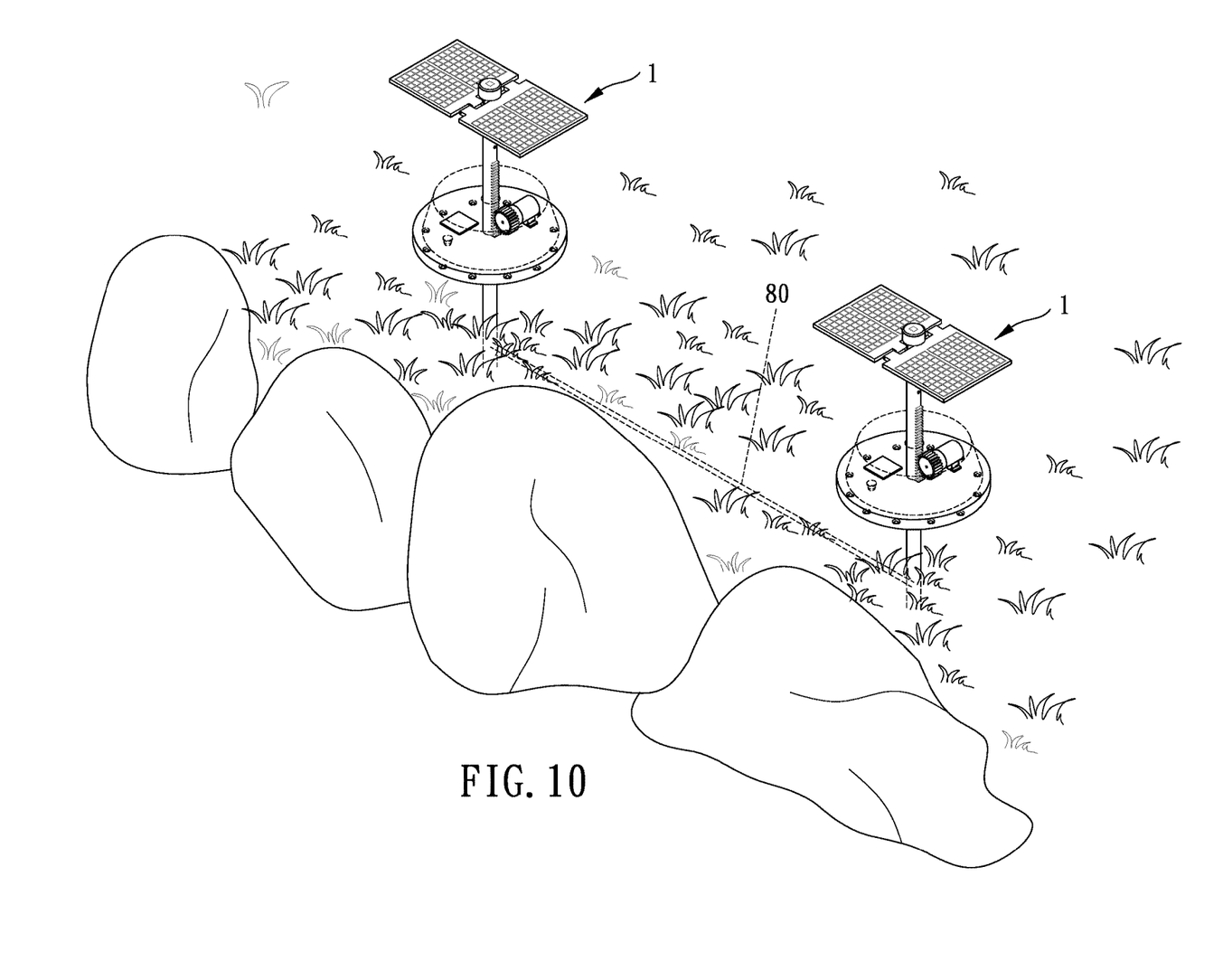
FIG. 10 is a schematic diagram of a third preferable embodiment of the present invention in use.

Please refer to FIG. 9, a spike light assembly is provided, including a plurality of said spike lights 1 as described above. The plurality of said spike lights 1 are communicative with one another in a wired or wireless connection manner. In this embodiment, said processors 23 of the plurality of said spike lights 1 are wirelessly communicated with one another, the plurality of said spike lights 1 may be communicated with one another by Wi-Fi, Bluetooth or other wireless communications so as to be operated at the same time, such as simultaneously driving the lifting mechanism 30, controlling the plurality of said lightening units 2 or the like. A third preferable embodiment of the present invention is shown in FIG. 10. The plurality of said spike lights 1 are each connected with one another in a wired manner, for example, the plurality of said spike lights 1 are electrically connected by wires 80.

The spike light and the pike light assembly of the present invention are automatically adjustable in a position of the light body through determining the plant height signal by the processor.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A spike light, including:
    a rod body, extending along an axial direction, including an insertion portion configured to be inserted into a base portion for planting at least one plant;
    a light body, mounted to the rod body and being movable along the axial direction, including at least one lightening unit, a plant growth sensor and a processor, the at least one lightening unit and the plant growth sensor being respectively electrically connected with the processor, the at least one lightening unit configured to project light toward the base portion;
    a lifting mechanism, including a first lifting unit disposed on the rod body and a second lifting unit disposed on the light body, one of the first lifting unit and the second lifting unit being drivable by a power source, the second lifting unit being movably connected with the first lifting unit, the power source being electrically connected with the processor;
    wherein the plant growth sensor obtains a height of the at least one plant and produces and transmits at least one plant height signal to the processor, and the processor drives the power source to drive at least one of the light body and the lifting mechanism when the processor determines that the at least one plant height signal is different from a predetermined height signal.

2. The spike light of claim 1, wherein one of the first lifting unit and the second lifting unit is a toothed rack, the other of the first lifting unit and the second lifting unit is a gear engaged with the toothed rack, the power source drives the gear to rotate, and the power source is provided from a driving motor.

3. The spike light of claim 1, wherein each of the at least one lightening unit includes a plurality of luminaries, at least two of the plurality of luminaries have different light colors; the processor controls at least one of the plurality of luminaries to be turned on or off according to the at least one plant height signal of the at least one plant sensed by the plant growth sensor; the light body includes a plurality of said lightening units, and the plurality of said lightening units are disposed around the axial direction.

4. The spike light of claim 1, wherein the rod body further includes a sheltering portion, the second lifting unit is disposed between the sheltering portion and the insertion portion, and the sheltering portion shelters the second lifting unit in the axial direction.

5. The spike light of claim 1, further including a central processing unit and a plant controlling application (APP), wherein the processor and the plant controlling APP are respectively communicated with the central processing unit, the central processing unit stores a processor controlling process information and a plant controlling APP controlling process information, and the plant controlling APP operates to obtain the processor controlling process information and the plant controlling APP controlling process information.

6. The spike light of claim 1, further including a solar device, wherein the solar device includes two solar panels, the solar device is electrically connected with the light body and the lifting mechanism, and the two solar panels are swingably disposed on the rod body.

7. The spike light of claim 4, wherein the insertion portion is tapered-shaped; the first lifting unit is a rack, the second lifting unit is a gear engaged with the rack, the power source drives the gear to rotate, the power source is provided from a driving motor; the rod body further includes a sheltering portion, the sheltering portion is spaced apart from the insertion portion, the second lifting unit is disposed between the sheltering portion and the insertion portion, the sheltering portion shelters the second lifting unit in the axial direction; the spike light further includes a central processing unit and a plant controlling application (APP), the processor and the plant controlling APP are respectively communicated with the central processing unit, the central processing unit stores a processor controlling process information and a plant controlling APP controlling process information, the plant controlling APP is loadable into the processor controlling process information and the plant controlling APP controlling process information; the spike light further includes a solar device, the solar device includes two solar panels, the solar device is electrically connected with each of the at least one lightening unit, the plant growth sensor, the processor and the power source, the two solar panels are swingably disposed on the rod body; the light body further includes a light sensor which is electrically connected to the processor, the processor controls each of the at least one lightening unit and an angle between respective one of the two solar panels and the axial direction according to an ambient light information produced by the light sensor; the central processing unit further stores a plurality of plant growth light regulating informations, the processor controls the at least one lightening unit according to the plurality of plant growth light regulating informations and the at least one plant height signal sensed by the plant growth sensor; the plant growth sensor is configured to obtain a plant image information of the at least one plant and upload the plant image information to the central processing unit; the light body further includes a casing and a bearing portion, each of the at least one lightening unit and the plant growth sensor are respectively disposed on a side of the bearing portion, and the power source and the second lifting unit are respectively disposed on another side of the bearing portion, the casing covers the bearing portion, the power source and the second lifting unit are received between the casing and the bearing portion.

8. The spike light of claim 1, wherein the rod body includes an outer tube and an inner tube which is communicated with the outer tube, a circumferential wall of the outer tube includes an opening disposed therethrough, the outer tube and the inner tube define a liquid storage chamber therebetween, the outer tube has a plurality of through holes which communicate the liquid storage chamber and an external environment, the inner tube includes a liquid inlet and a liquid outlet, the liquid inlet is communicated with the opening, and the liquid outlet is communicated with the through holes and the liquid storage chamber.

9. A spike light assembly, including a plurality of said spike lights of claim 1, wherein the plurality of said spike lights are communicative with one another in a wired or wireless connection manner.

10. The spike light of claim 9, wherein said processors of the plurality of said spike lights are wirelessly communicated with one another.

* * * * *